Feb. 3, 1959 W. B. LEAVENS, JR 2,872,590

PHOTOELECTRIC SCANNING DEVICE

Filed Nov. 12, 1954 3 Sheets-Sheet 1

INVENTOR.
William B. Leavens, Jr.,
BY George D. Richards
Attorney

INVENTOR.
William B. Leavens, Jr.,
BY George D. Richards
Attorney

Feb. 3, 1959 W. B. LEAVENS, JR 2,872,590

PHOTOELECTRIC SCANNING DEVICE

Filed Nov. 12, 1954 3 Sheets-Sheet 3

INVENTOR.
William B. Leavens, Jr.,
BY George D. Richards
Attorney

United States Patent Office 2,872,590
Patented Feb. 3, 1959

2,872,590

PHOTOELECTRIC SCANNING DEVICE

William B. Leavens, Jr., Llewellyn Park, N. J., assignor to Wilkata Codes, Inc., Kearney, N. J., a corporation of New Jersey Application November 12, 1954, Serial No. 468,299
2 Claims. (Cl. 250—219)

Figure 1:
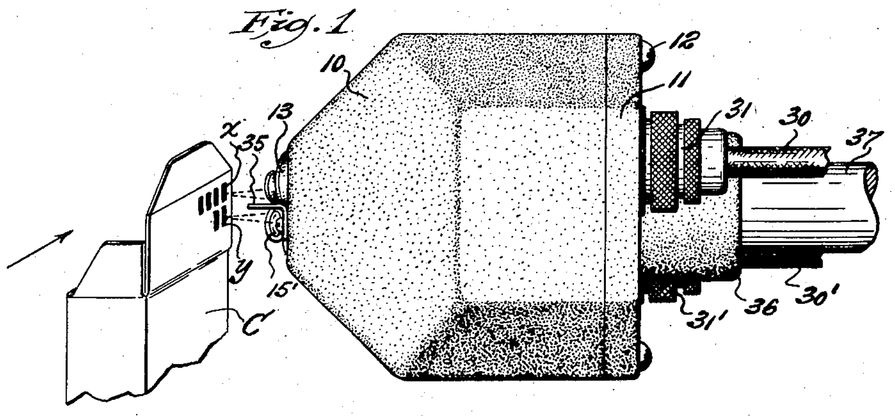

This invention relates to an improved photoelectric scanning device for automatically inspecting code bearing articles, such as cartons, labels or other items, with the object of preventing use of any such articles other than those bearing a selected particular identifying code marking.

In the art of machine packaging, labeling and other operations with respect to packing or other preparation of merchandise for distribution, it is known to provide the carton or other container, label or other item in use with code marking, which identifies the item dealt with to the exclusion of all others, to the end that inadvertent use of inappropriate items will be avoided. Such code markings are adapted to be scanned by photoelectric means which reacts to the code markings so as to transmit signals corresponding thereto to suitable electronic counter means by which the signals are coordinated, said latter means being adapted to so control the packaging or other machinery dealing with the items that proper items will be passed for use, but items bearing code marking different from the selected particular marking in use, or bearing no code marking, will be rejected.

In code marking it is desirable to provide a form and arrangement thereof which can be accommodated within an often limited available surface area of the item to be identified thereby, but which is nevertheless subject to considerable permutation, so that a large number of different particular code displays can be made available. To this end it is known, as disclosed in my co-pending application for Letters Patent Serial Number 346,773, now abandoned, to provide a plurality of parallelly contiguous rows of spaced code marks, ordinarily two such rows, the length of each row being adapted to accommodate from one to a considerable number of said code marks, whereby permutation of one or more of the marks contained in one row relative to one or more of the marks contained in the other row or rows provides a multiplicity of selectable particular code displays.

In photoelectrically scanning code displays, the marks of which are arranged in parallelly contiguous rows one above another, it has heretofore been necessary to employ a plurality of scanning devices successively disposed in spaced apart relation along the path of movement of the items undergoing inspection, and arranged so that the same respectively scan only the code marks of different single rows thereof. Due to the spaced apart relation of said scanning devices, the first scanning device scans the code marks of one row (e. g. the top row) of one item, while the code marks of another row (e. g. the bottom row) of said item can not be scanned until said item is advanced to the position of the second scanning device. By reason of this, while one row of code marks on one item is being scanned, the other row of code marks on an entirely different and differently located item, generally several items removed from the first item, is being scanned. Such method of scanning is practical so long as the succession of moving items are uniformly relatively spaced and continuously advanced, but is not wholly satisfactory for the reason that, in starting and stopping of the operations, manual control of the operations is required whenever the two items scanned are not respectively opposed to the respective scanning devices, and consequently normal automatic operation can not begin until separate items are respectively first presented simultaneously to the respective scanning devices. Due to this, manually controlled by-pass running of several items is necessary in starting and stopping the operations, which entails both loss of time and material. Furthermore, in the event that an improperly coded item or an uncoded item is included in the run of items, the presence of which results in stopping operations, not only are two visual examinations necessary to determine whether the item opposed to the first or second scanning device caused the stoppage, but the same difficulties of again starting operations arises after removal of the improper item.

Having the above conditions in view, it is an object of this invention to provide a novel construction of photoelectric scanning device by means of which at least two rows of code marks of each individual item undergoing inspection can be simultaneously scanned, thus avoiding the disadvantages above referred to incident to scanning of different rows of code marks of two separate items.

The invention has for a further object to provide a novel construction of photoelectric scanning device by means of which code marks of all rows thereof on a single item, which are aligned perpendicular to the lengths of said rows extending in the direction of travel of the item, can be simultaneously scanned, whereby signals from all said rows of code marks on each individual item are produced for transmission to an electronic counter means by which operations dealing with the items are controlled.

Figure 2:
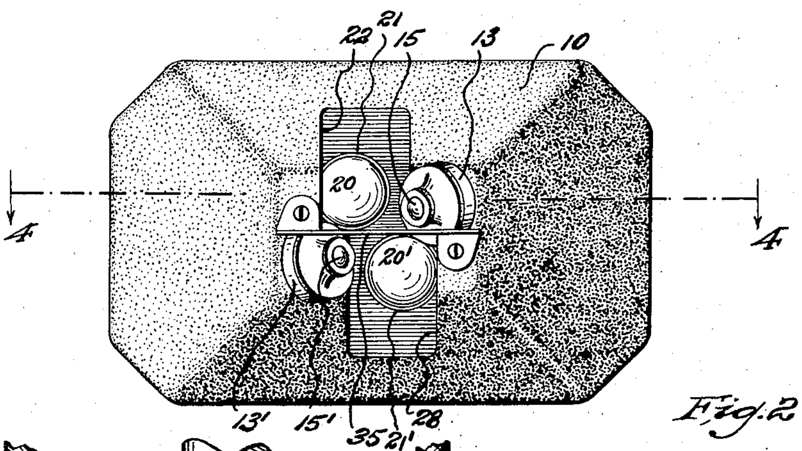
Figure 3:
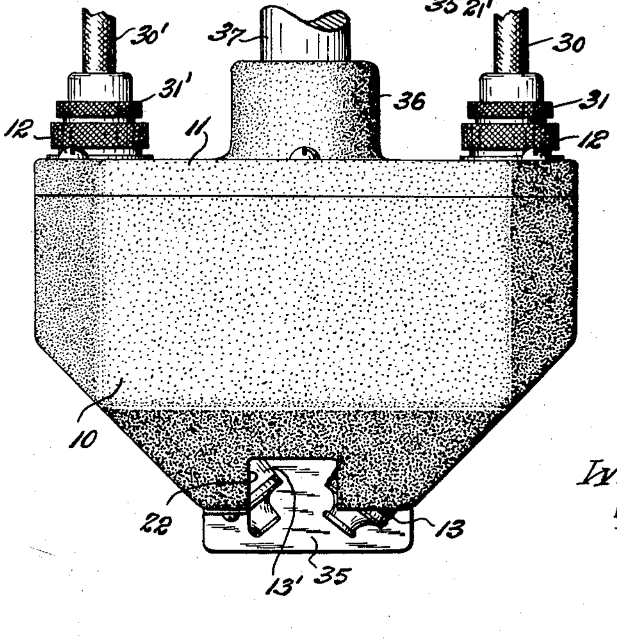

The above and other objects will be understood from a reading of the following detailed description of my present invention in connection with the accompanying drawings, in which:

Fig. 1 is a side elevational view of the photoelectric scanning device of this invention, showing a coded item (illustratively a carton to be filled by packing machine operation) undergoing inspection thereby, the code display of which (for the purpose of illustration) comprises two rows of code marks; Fig. 2 is a front elevational view of the same; and Fig. 3 is a top plan view of the same.

Figure 4:
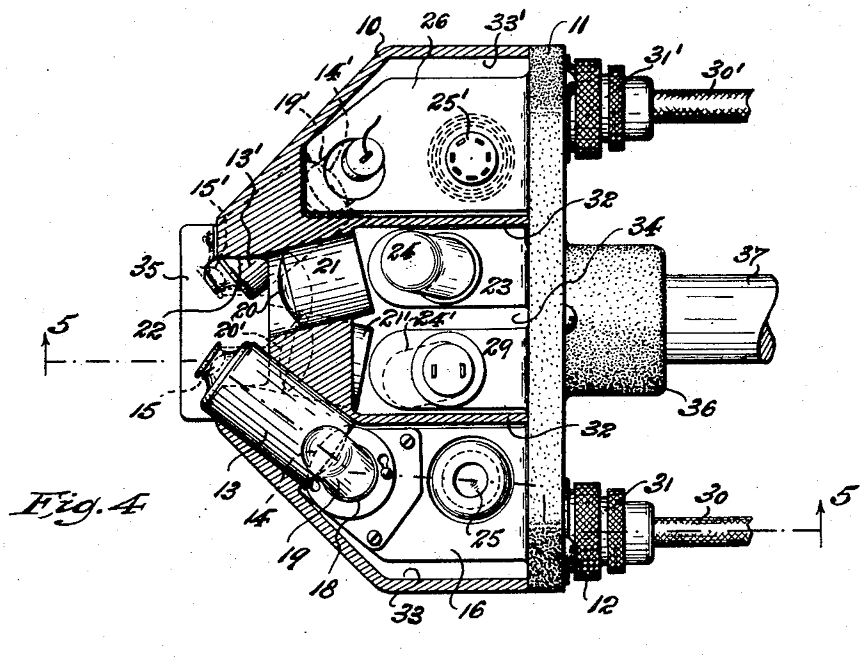
Figure 5:
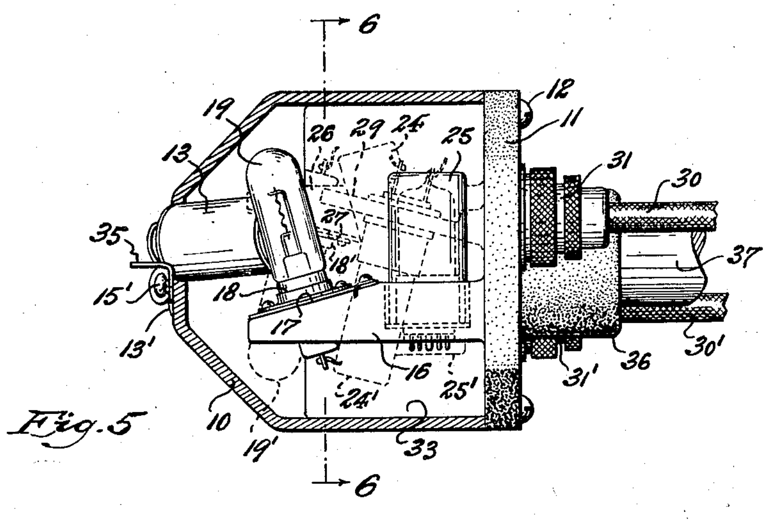
Figure 6:
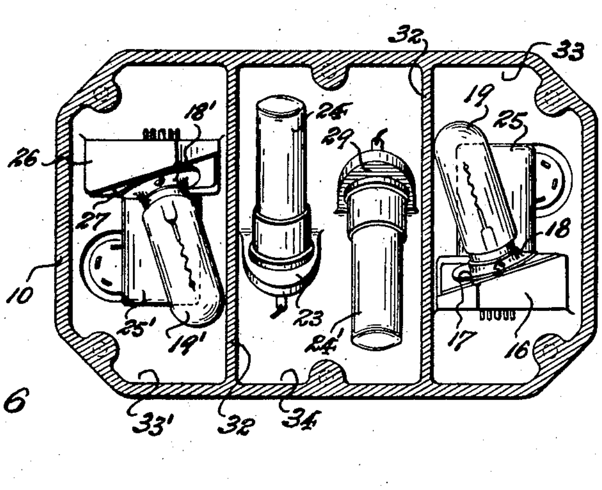

Fig. 4 is a horizontal transverse sectional view of the scanning device, taken substantially on line 4—4 in Fig. 2; Fig. 5 is a vertical cross sectional view of the scanning device, taken substantially on line 5—5 in Fig. 4; and Fig. 6 is a vertical transverse sectional view of the scanning device, taken substantially on line 6—6 in Fig. 5.

Figure 7:
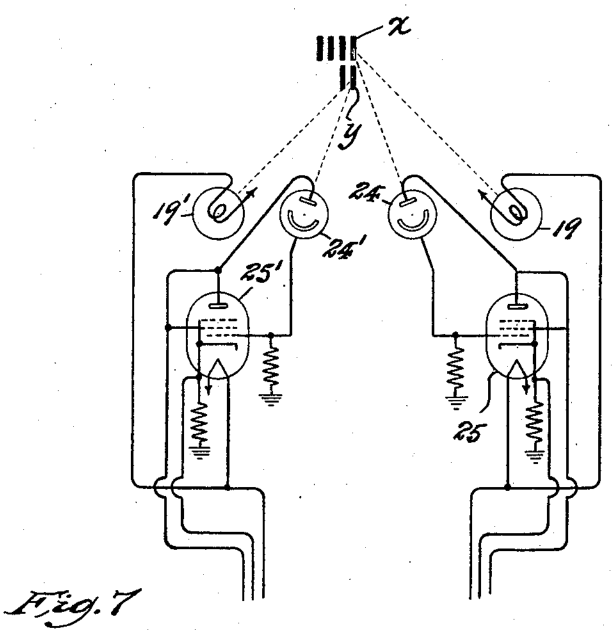

Fig. 7 is a wiring diagram showing the circuits of the photoelectric scanning systems of the scanning device.

The photoelectric scanning device of this invention is adapted to inspect items having code displays thereon consisting of a selected number of code marks arranged in at least two contiguous rows on a contrasting surface, whereby the items are provided with alternate dark and light portions of different light reflecting values. The code marks of the respective rows thereof may be of any desired configuration, but conveniently comprise spaced apart dark lines or bars perpendicular to the length of the row thereof, thus providing intermediate light lines or bars in alternated relation thereto. Preferably, although not necessary, the perpendicular lines or bars of one row are disposed in vertical alignment relative to the corresponding perpendicular lines or bars of the adjacent row. For purpose of illustration, but without intention of limitation thereto, an item in the form of a carton C to be filled by packaging machine operation is shown, the same being provided on a suitable part thereof, such e. g. as its tuck flap, with a code display comprising an upper row of spaced perpendicular dark lines or bars *x*, and a contiguous bottom row of spaced perpendicular dark lines or bars $y$ (see Fig. 1). The cartons so coded are adapted to be successively advanced by a packaging machine in manner well known to the art, and before reaching a loading station of said machine, the same are caused to pass a dual scanning device, so that each individual carton is completely inspected at a single point in its path of travel whereby to assure that the same are appropriate for reception of the selected content to be loaded thereinto for enclosure therein.

The scanning device according to this invention, which (for the purpose of illustration) is a dual scanning device, comprises a rearwardly open casing 10, the rearward open back of which is normally closed by a back plate 11 that is detachably secured to the casing 10 by suitable fastening means, such as screws 12. Housed within the casing 10 are two photoelectrical scanning systems comprising an upper scanning system disposed in downwardly and forwardly inclined plane, above a medial horizontal plane which intersects the casing, and thus being adapted to focus upon the top row of code marks $x$ carried by a carton C; and a lower scanning system disposed in upwardly and forwardly inclined plane below said medial horizontal plane which intersects the casing, and thus being adapted to focus upon the bottom row of code marks $y$ carried by a carton C.

The upper photoelectric scanning system comprises a light projecting and concentrating lens system provided by a tubular barrel 13 disposed for angular extension outwardly through the front wall portion of the casing 10 from one side, e. g., the right side, of the casing interior toward a medial vertical plane which intersects the casing. Said barrel 13 is provided at its rearward or inner end with an inner lens 14 of relatively large diameter, and at its forward or outer end with a lens 15. The axis of this lens system 14—15 is inclined to direct light from a source, comprising an electric lamp, upon the top row code marks $x$ of the code display carried by a carton C, the projected light being in the form of an image of the filament of said lamp. The back plate 11 of the casing 10 is provided with a bracket member 16 disposed to extend into the lower right hand side portion of the casing interior. Said bracket member 16 is shaped at its free end portion to provide an upwardly presented inclined seat 17 upon which the socket 18 for an upwardly extending electric lamp 19, which serves as an independent light source for the upper scanning system, is supported. The inclination of said seat 17 is such as to angularly dispose the lamp 19 in upstanding position so that its axis is substantially perpendicular to and intersects the inclined axis of the lens system 14—15, whereby the light projected from the lamp 19, in the form of an image of its filament by said lens system, will coincide with individual code marks $x$ passing across the light path. Means for transmitting reflected light from code marks traversing the direct light path comprises a lens 20 supported by a tubular barrel 21 which is disposed for angular extension inwardly through the front wall portion of the casing 10 from right to left, so that the axis of said lens 20 is divergent to the axis of the direct light projecting lens system 14—15, and is directed toward the left side portion of the central interior part of the casing. To avoid obstruction of the reflected light path, the exterior of the casing front wall is suitably indented, as at 22, to provide free light traversing space. The back plate 11 of the casing is provided with a forwardly extending, upwardly inclined bracket member 23, disposed to extend therefrom into the lower leftward side portion of said central interior part of the casing, whereby to support a phototube 24 in upstanding position so that its axis is substantially perpendicular to and intersects the inclined axis of the reflected light transmitting lens 20. Also supported in upstanding position upon the bracket member 16 is a thermionic tube 25 which forms part of the upper photoelectric scanning system, and which is adapted to transmit impulses to an electronic counter (not shown) in response to signals produced by the phototube 24.

The lower photoelectric scanning system comprises a light projecting and concentrating lens system provided by a tubular barrel 13' disposed for angular extension outwardly through the front wall portion of the casing 10 from the other side, i. e. the left side, of the casing interior toward a medial vertical plane which intersects the casing. Said barrel 13' is provided at its rearward or inner end with an inner lens 14' of relatively large diameter, and at its forward or outer end with a lens 15'. The axis of this lens system 14'—15' is inclined to direct light from a source, likewise comprising an electric lamp, upon the bottom row of code marks $y$ of the code display carried by a carton C, the projected light being in the form of an image of the filament of said lamp. The back plate 11 of the casing 10 is provided with a bracket member 26 disposed to extend into the upper left hand side portion of the casing interior. Said bracket member 26 is shaped at its free end portion to provide a downwardly inclined seat 27 upon which the socket 18' for a downwardly extending electric lamp 19', which serves as an independent light source for the lower scanning system, is supported. The inclination of the seat 27 is such as to angularly dispose the lamp 19' in a depending position so that its axis is substantially perpendicular to and intersects the inclined axis of the lens system 14'—15', whereby the light projected from the lamp 19', in the form of an image of its filament, by said lens system, will coincide with individual code marks $y$ passing across the light path. Means for transmitting reflected light from code mark traversing said direct light comprises a lens 20' supported by a tubular barrel 21' which is disposed for angular extension inwardly through the front wall portion of the casing 10 from left to right, so that the axis of said lens 20' is diveregnt to the axis of the direct light projecting lens system 14'—15', and is directed toward the right side portion of the central interior part of the casing. To avoid obstruction of this reflected light path, the exterior of the casing front wall is suitably indented, as at 28, to provide free light traversing space. The back plate 11 of the casing 10 is provided with a forwardly extending, downwardly inclined bracket member 29, disposed to extend therefrom into the upper rightward side portion of said central interior part of the casing, whereby to support a phototube 24' in dependent position so that its axis is substantially perpendicular to and intersects the inclined axis of the reflected light transmitting lens 20'. Also supported in dependent position by the bracket member 26 is a thermionic tube 25' which forms part of the lower photoelectric scanning system, and which is adapted to transmit impulses to the electronic counter in respons to signals produced by the phototube 24'.

To prevent stray light from the lamps 19 and 19' reaching the phototubes 24 and 24', the interior of the casing 10 is divided by vertical partitions 32 to provide a separate enclosing chamber 33 for the lamp 19 at the right hand side of the casing, and a separate enclosing chamber 33' for the lamp 19' at the left hand side of said casing, thus providing an intermediate chamber 34 to contain both phototubes 24 and 24', whereby the latter are masked or shielded from stray light emanating from said lamps.

The angle of reflection of the light image from the lamp 19 to the phototube 24 of the upper scanning system approximates 45°, and likewise the angle of reflection of the light image from the lamp 19' to the phototube 24' of the lower scanning system also approximates 45°. By offsetting the phototube 24 of the upper scanning system to the left of a medial vertical plane which intersects the casing, and offsetting the phototube 24' of the lower scanning system to the right of said medial vertical plane, and by disposing the lamps 19 and 19' and the phototubes 24 and 24' in relatively inverted positions, said phototubes can be placed substantially side by side within the common chamber 34, so that a very compact device of minimum dimensions and bulk is attained; and since, in such arrangement, the reflected light directed toward the phototube 24 of the upper scanning system is divergent to the reflected light directed toward the phototube 24' of the lower scanning system, the paths of reflected light will not interfere one with the other, and will only reach the respective phototubes to which they are respectively directed.

The downwardly and forwardly inclined plane of the upper scanning system is at such angle relative to and spaced above a horizontal medial plane which intersects the casing 10, and is so related to a vertical medial plane which intersects the casing 10, that its focus point will lie substantially in the latter plane at such distance above said horizontal medial plane as to coincide with a code mark *x* of the upper row of code marks carried by a carton C. On the other hand, the upwardly and forwardly inclined plane of the lower scanning system is at such corresponding angle relative to and spaced below the horizontal medial plane which intersects the casing 10, and is so related to the vertical medial plane which intersects the casing that its focus point will also lie substantially in the latter plane at such distance below said horizontal medial plane as to coincide with a code mark *y* of the lower row of code marks carried by a carton. By reason of such relation and spacing of the respective focus points of the respective scanning systems, it will be apparent that said scanning systems are adapted to simultaneously scan and react to code marks of the respective rows thereof which are in vertical alignment one with the other.

It will also be apparent that the inclined planes of the upper and lower scanning systems are convergent toward their focus points. In order to assure against any possible interference of the direct light projection of the respective scanning systems one with the other in the vicinities of their focus points, an external horizontal shield or visor 35 is affixed to the front of the casing 10, so as to be interposed between the axes of said light paths, whereby the incidences of said light paths with respect to upper and lower code marks are kept separated for accurate scanning effect.

In Figs. 4 to 6, the wiring making up the circuits of the respective upper and lower photoelectric scanning systems has been omitted, but the circuits will be understood from an inspection of the wiring diagram shown in Fig. 7. The incoming and outgoing lines of the respective circuits may be carried in respective cables 30 and 30', and connected through the back plate 11 of the casing 10 by suitable connecting means 31 and 31'.

Suitable means is provided for mounting the casing 10 in connection with means for supporting the dual scanning device at a place of use. For example, the back plate 11 of the casing 10 is provide with an externally projecting socket 36 to receive a supporting arm 37 of suitable supporting means.

Although for purposes of illustration I have shown and above specifically describe the scanning device of this invention in a dual form adapted to simultaneously scan two rows of code marks, it will be obvious that the device can be furnished in a form adapted to simultaneously scan more than two rows of code marks, by merely adding additional scanning systems, each of which are relatively disposed to adjacent systems in the angular relations thereto above set forth.

It will also be understood that various changes may be made in the form and construction of the scanning device of this invention without departing from the scope of this invention as defined by the following claims. It is therefore intended that the matter contained in the above description and shown in the accompanying drawings shall be interpreted as illustrative and not in a limiting sense.

Having now described my invention, I claim:

1. A compact photoelectric scanning unit for inspecting articles in movement relative thereto, said articles having code marks thereon arranged in adjacent parallel rows one above another, each row containing a predetermined number of marks on a contrasting surface whereby alternate dark and light portions of different light reflecting values are provided, said unit being adapted to simultaneously scan said rows of code marks, said unit comprising a casing, a plurality of photoelectric scanning systems contained within the casing, one system being disposed in a plane inclined relative to a plane intermediate said systems which is perpendicular to the plane of the code mark bearing faces of the articles to be scanned and directed toward the path of relative article movement at the level of an upper row of the article code marks, and another system being disposed in a plane oppositely inclined relative to said plane intermediate said systems and directed toward the path of relative article movement at the level of a lower row of the article code marks, said scanning systems being respectively focused in a common verticle plane perpendicular to the rows of code marks, whereby code marks of said respective rows thereof which are aligned in vertical plane are simultaneously exposed to scanning effect of said respective scanning systems, each said scanning system comprising a light directing lens system mounted in the front wall of the casing with its axis extending in the inclined plane of the system of which it forms a part, an electric lamp having an axial filament, means to support the lamp at an inclination which positions its filament perpendicular to and so as to intersect the axis line of said lens system, whereby to project an image of said filament in aligned impingement upon code marks of a row thereof moving across the light path, another lens mounted in the front wall of the casing with its axis divergent to the axis of the axis of said light directing lens system, whereby to transmit reflected light from said row of code marks, a phototube, and means to support the latter at an inclination adapted to position its axis perpendicular to the axis of said reflected light transmission lens, internal partitions dividing the interior of the casing to provide an individual chamber for the lamp of each scanning system and a common chamber for the phototube of each scanning system, whereby the phototube of one system is shielded from stray light emanating from the lamp of another system, and an external visor projecting externally from the front wall of the casing in a plane intermediate adjacent scanning systems, whereby incidences of projected and reflected light with respect to code marks of adjacent rows thereof simultaneously scanned are separated against interference.

2. A photoelectric scanning unit according to claim 1, wherein the angle of divergence of direct and reflected light paths of the respective scanning systems approximates 45°, and wherein the phototubes of said respective systems are disposed substantially in side by side spaced apart relation within the common chamber therefor, respectively at sides of said chamber remote from the lamps by which they are energized and in straddling relation to the medial vertical plane in which the focus points of said scanning systems are aligned, whereby reflected light paths respectively directed toward the respective phototubes diverge laterally without mutual interference.

References Cited in the file of this patent

UNITED STATES PATENTS

| | | |
|---|---|---|
| 1,548,102 | Sherman | Aug. 4, 1925 |
| 2,197,514 | Barnes | Apr. 16, 1940 |
| 2,224,646 | Friedman et al. | Dec. 10, 1940 |
| 2,288,430 | Bauman | June 30, 1942 |
| 2,514,405 | Marihart | July 11, 1950 |
| 2,631,243 | Weber et al. | Mar. 10, 1953 |